United States Patent
Strobel et al.

(10) Patent No.: US 11,365,343 B1
(45) Date of Patent: *Jun. 21, 2022

(54) SOLID SCALE INHIBITOR AND METHOD OF MANUFACTURE

(71) Applicants: Jonathan R. Strobel, Cypress, TX (US); Larry W. Gatlin, Montgomery, TX (US); Mickey Tucker, Montgomery, TX (US); Jason Helander, Richmond, TX (US)

(72) Inventors: Jonathan R. Strobel, Cypress, TX (US); Larry W. Gatlin, Montgomery, TX (US); Mickey Tucker, Montgomery, TX (US); Jason Helander, Richmond, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/332,129

(22) Filed: May 27, 2021

Related U.S. Application Data

(63) Continuation-in-part of application No. 17/241,569, filed on Apr. 27, 2021, now abandoned.

(60) Provisional application No. 63/158,234, filed on Mar. 8, 2021.

(51) Int. Cl.
*C09K 8/528* (2006.01)

(52) U.S. Cl.
CPC .................................. *C09K 8/528* (2013.01)

(58) Field of Classification Search
CPC .................................. C09K 8/52; C09K 8/528
See application file for complete search history.

(56) References Cited

FOREIGN PATENT DOCUMENTS

WO    WO 2019/052272    *    3/2019

* cited by examiner

*Primary Examiner* — Kumar R Bhushan
(74) *Attorney, Agent, or Firm* — Leavitt Eldredge Law Firm

(57) ABSTRACT

A solid scale inhibitor for use in fracking operations to inhibit scale build up, includes a powdered composition having a salt component and an acid component; the powdered composition is 100% dissolvable; and the acid component increases the dissolution rate associated with the salt component, thereby preventing the salt component from contributing to scaling formation in one or more production lines within a fracking operation. While both the salt and the acid in the present invention inhibit scale formation on their own, the acid (HEDP in the preferred embodiment) dissolves quickly, while the salt (HA in the preferred embodiment) dissolves very slowly; by combining the two, the dissolution rate of the acid is slowed and the dissolution rate of the salt is increased. Thus providing for an effective long term solid scale inhibitor.

7 Claims, 4 Drawing Sheets

SOLID SCALE INHIBITOR AND METHOD OF MANUFACTURE

BACKGROUND

1. Field of the Invention

The present invention relates generally to scale inhibitors and methods of manufacture, and more specifically to a solid scale inhibitor that utilizes a salt and an acid, wherein the acid decreases the dissolution rate of the salt, thereby preventing the salt from contributing to scaling formation. The resultant salt of the present invention forms the novel scale inhibitor which remains in the formation a time less than indefinite in the order of multiple years, especially after a renewable treatment.

2. Description of Related Art

Fracking operations are well known in the art and are effective means of extracting oil or gas from underground rock formations. In conventional operations, it is common to utilize water or aqueous mixtures, as well as proppant (frac sand), and chemical additives in an injection procedure. The injection procedure utilizes high pressures to create small (millimeter scale) cracks/fractures within the targeted rock formation. Once the formation is adequately fractured, pumps are shut down, pressures are reduced, and the cracks will begin to close. The frac sand, now in place will "prop" open the fractures allowing for oil and gas to flow through the cracks and then to the well. These flow paths will have varying sizes, some of which may only be as large as a grain of sand.

One common problem is the formation of scale within such pathways, cracks, and fractures, which leads to a limited lifespan of the fracking site. It is well documented that only 10-40% of the fluids pumped during a frac operation will be produced back to the surface. The increased concentrations of various ions in the produced water present a higher risk of mineral scaling such as calcium carbonate or calcium sulfate. These precipitates may deposit within the conduits, thereby forming scale build up, which eventually leads to the closing off and blocking of various fractures, leading to the inability for oil and gas to produce from those fractures.

In order to overcome the above problem, a plurality of solid scale inhibitors have been developed to prevent scale build up within the underground rock formations. Solid scale inhibitors work within the conduits by removing the scale forming ions and suspended solids from the liquid, thereby slowly preventing the buildup of scale. Scale inhibitors can increase the lifespan of the fracking site, however, there is room for improvement, as conventional scale inhibitors have a limited life span within the fracture. In some cases, in effort to prolong the life span of scale inhibitor products, they are attached to insoluble/charged surfaces such as diatomaceous earth, clays, graphite or any solid with high surface area. This presents a problem in that once the scale inhibitor is dissolved the pore spaces are left with an insoluble obstruction which will migrate and build up within the conduits, cracks and perforations leading to formation damage.

Accordingly, there is a need for a scale inhibitor with an increased lifespan and a decreased particle size for improved anti-scale operations.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
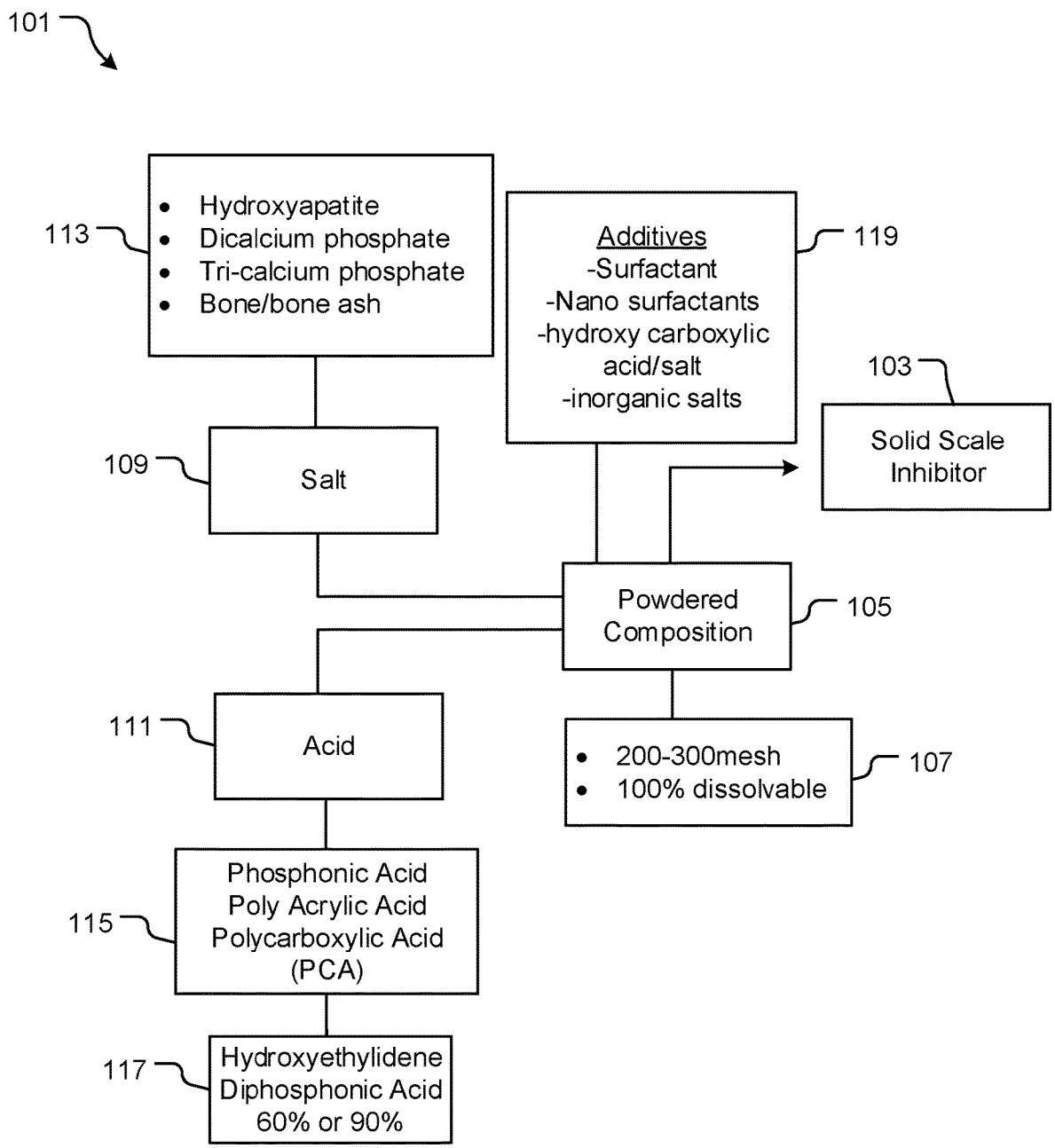
FIG. 1 is a schematic of the composition and properties of a solid scale inhibitor in accordance with the present application.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional scale inhibitors. Specifically, the present invention provides for a powdered composition including a salt and an acid, wherein the invention provides for increasing rate of dissolution of the salt, thereby increasing the lifespan of the composition. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a schematic 101 of the composition and properties of a solid scale inhibitor (SSI) 103 in accordance with a preferred embodiment of the present application. It will be appreciated that SSI 103 overcomes one or more of the above-listed problems commonly associated with conventional scale inhibitors.

In the contemplated embodiment, SSI 103 is a powdered composition 105, wherein the powdered composition is 100% dissolvable and is of a small particle size, namely 200-300 mesh in the preferred embodiment 107. The small particle size allows for the SSI to travel to distant locations within a production line of a fracking operation.

As shown, the SSI 103 is primarily composed of two components, namely a salt 109 and an acid 111. It is contemplated and should be appreciated that the salt and acid may vary, and may be selected from a group of salts and acids as would be known and discovered in the art. In the preferred embodiment, the salt 109 is selected from one of hydroxyapatite (HA), dicalcium phosphate, tri-calcium phosphate, or bone/bone ash 113. It will be appreciated that this selection ensures that the SSI is environmentally conscious.

As further shown, the acid 111 in the preferred embodiment is a phosphonic acid 115, which may be Hydroxyethylidene Diphosphonic Acid (HEDP) 60% or 90% 117. It should further be appreciated and is contemplated that various other phosphonic acids, poly phosphonic acids, poly acids or polymeric acids may be selected, tested, and used. In addition, the acid component may be selected from one of Polyphosphonic Acids, Poly Acrylic Acids, Polycarboxylic Acid, a mixture including AA/AMPS, a mixture including partial sodium or potassium salts, and a mixture including sodium and calcium salt of ethylene diamine tetraphosphonic acid.

In some embodiments, an additive/surfactant 119 may further be added to the powdered composition 105 as needed for compositional integrity of the powdered composition. Various additives 119 are known in the art and may be selected based on the knowledge of those skilled in the art.

It should be appreciated that one of the unique features believed characteristic of the present application is the use of a salt and acid powdered composition as a solid scale inhibitor. It should be appreciated that the acid acts to increase the dissolution rate of the salt and the salt decreases the solubility of the acid. These two reactants form a powdered composition that will inhibit scale formation by binding to scale forming ions and suspended solids within the fracking fluids. The resulting slow dissolution rate of the combined material helps to prolong the lifespan of the SSI 103 drastically, such that the SSI may last up to 10 years or for the life of the fracking operation, wherein the salt itself does not therefore contribute to scale buildup within the production lines.

Another unique feature believed characteristic of the present invention is that the powdered composition does not require a substrate or encapsulation for use in operation and is 100% dissolvable. It should be appreciated that the use of a solid that does not dissolve within fracking operations can lead to significant formation damage if the solid stays within the flow path, accordingly, the use of a 100% dissolvable solid scale inhibitor is desirable to prevent said damage. It should also be appreciated that, by introducing an SSI that does not require larger substrates or capsules, a fracking operation can ensure the smaller SSI reaches further into the fracture and has less potential to aggregate or otherwise restrict a flow path.

Figure 2A:
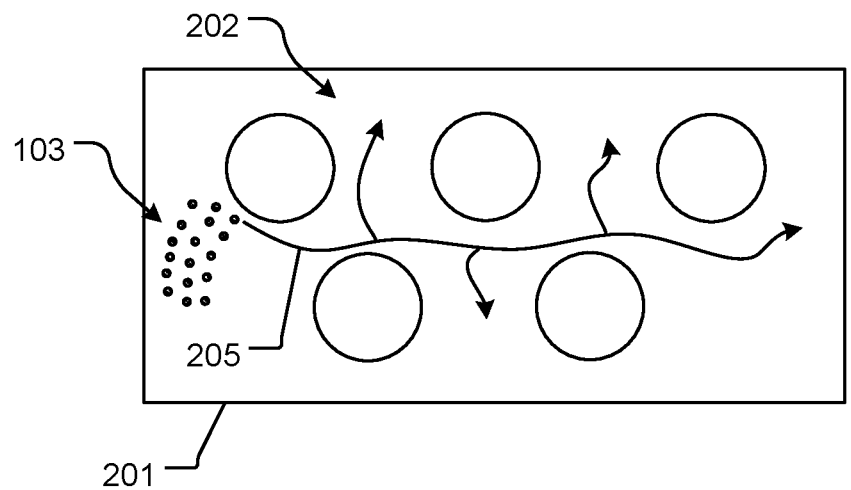
FIG. 2A is a schematic depicting the injection of the solid scale inhibitor of FIG. 1.
Figure 2B:
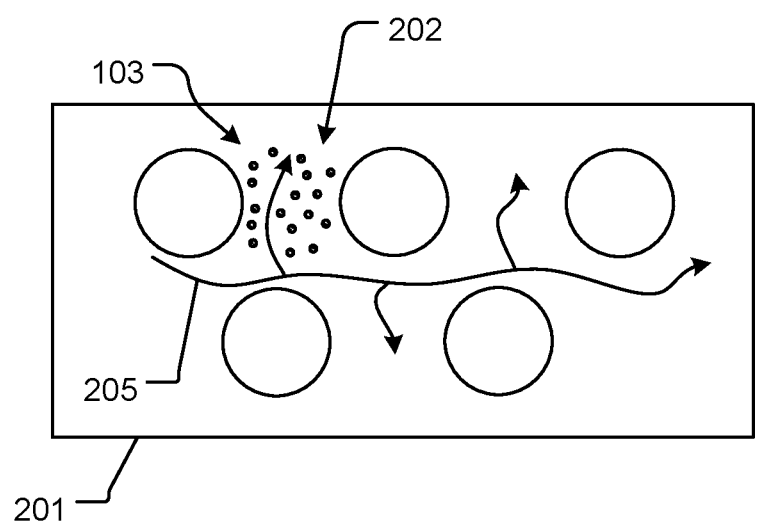
FIG. 2B is a schematic depicting the use of the solid scale inhibitor of FIG. 1.

In FIGS. 2A and 2B, the use of the SSI 103 within a production line 201 is shown. As shown, the production line 201 will have various conduits 202 of varying sizes, in which fluid flow 205 is desired. In conventional operations, the small conduits may become obstructed by conventional scale inhibitors. The present invention overcomes this by utilizing a small particle size, wherein the particles fit within the small channels to prevent scale build up while simultaneously not creating an obstruction, as shown in FIG. 2B. This is an improvement over the prior art.

Figure 3:
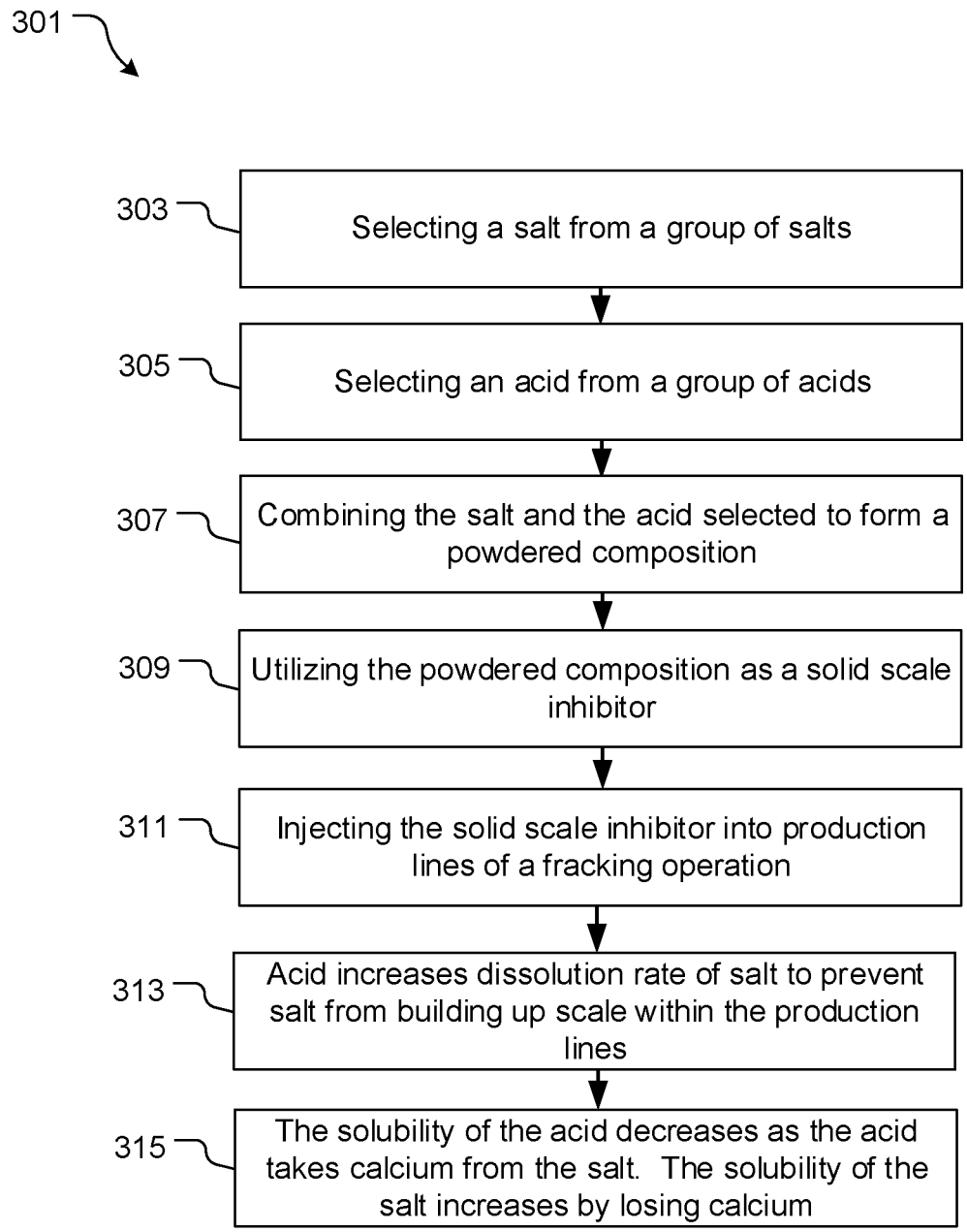
FIG. 3 is a flowchart of the method of manufacture and method of use of the solid scale inhibitor of FIG. 1.

In FIG. 3, a flowchart 301 depicts a method of manufacture and a method of use of the SSI of the present invention. During manufacture, a salt and an acid are selected, as shown with boxes 303, 305. The salt and acid selected are combined, in some embodiments with a surfactant, to form the powdered composition, as shown with box 307. The powdered composition is then utilized as a solid scale inhibitor in fracking operations, as is known in the art, as shown with boxes 309, 311. During use, the acid is configured to increase the dissolution rate of the salt to prevent the salt from building up as scale within the production lines, as shown with box 313. It should be appreciated that the combination of the salt and acid causes the initial acid to decrease in solubility as the acid takes calcium from the salt, while the initial salt increases in solubility by losing the calcium, as shown with box 315.

It should be appreciated that the salt and the acid of the present invention can each be considered a scale inhibitor on their own, however, the acid (HEDP in the preferred embodiment) dissolves quickly, while the salt (HA in the preferred embodiment) dissolves very slowly. By combining the two, the dissolution rate of the acid is slowed and the dissolution rate of the salt is increased. This feature provides for a novel and beneficial scale inhibitor over the prior art.

Figure 4:
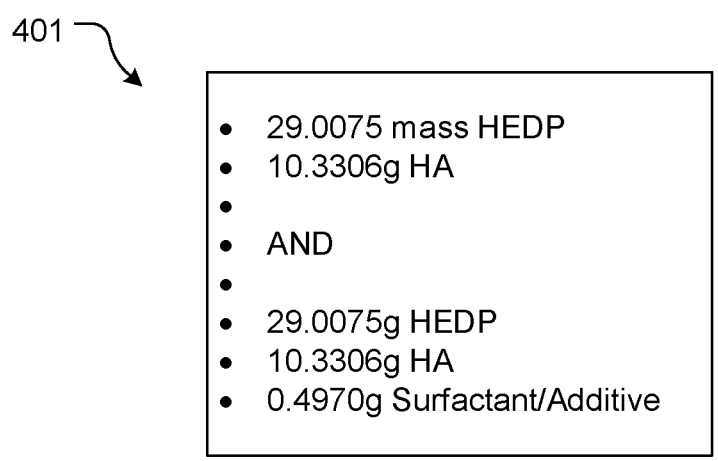
FIG. 4 is a box depicting the preferred composition of the solid scale inhibitor of FIG. 1.

Although it is contemplated that various salts and acids may be used and at various concentrations, the present invention contemplates the preferred composition 401 shown in FIG. 4. The preferred composition is approximately 29.0075 g HEDP and approximately 10.3306 g HA. In some embodiments, wherein an additive is included, the formulation may comprise approximately 29.0075 g HEDP and approximately 10.3306 g HA, with 0.4970 g additive. The preferred range of percentage by mass is 60-80% HEDP and 20-40% HA. In an embodiment that includes an additive, the preferred range of additive is 0-5% by mass.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A solid scale inhibitor for use in fracking operations to inhibit scale build up, the solid scale inhibitor comprising:
    a powdered composition including:
        a salt component, the salt component being scale inhibiting;
        an acid component, the acid component being scale inhibiting; and
        a surfactant;
    wherein the salt component and the acid component and the surfactant are combined into the powder composition;
    wherein the acid component makes up approximately 72.82% by mass of the powdered composition, the salt makes up approximately 25.94% by mass of the powdered composition, and the surfactant makes up approximately 1.24% by mass of the powdered composition;
    and
    wherein the acid component increases a dissolution rate associated with the salt component, thereby preventing the salt component from contributing to scaling formation in one or more production lines within the fracking operations.

2. The solid scale inhibitor of claim 1, wherein the salt component is Hydroxyapatite.

3. The solid scale inhibitor of claim 1, wherein the salt component is selected from a group consisting of bone ash, Tri-calcium phosphate, and Dicalcium phosphate.

4. The solid scale inhibitor of claim 1, wherein the acid component is a phosphonic acid.

5. The solid scale inhibitor of claim 1, wherein the acid component is selected a group consisting of Polyphosphonic Acids, Poly Acrylic Acids, Polycarboxylic Acid, a mixture including AA/AMPS, a mixture including partial sodium or potassium salts, and a mixture including sodium and calcium salt of ethylene diamine tetraphosphonic acid.

6. The solid scale inhibitor of claim 1, wherein the powdered composition has a powder particle size of 200-300 mesh.

7. The solid scale inhibitor of claim 1, wherein the acid is Hydroxyethylidene Diphosphonic Acid.

* * * * *